US009285607B2

(12) United States Patent
Tahsler et al.

(10) Patent No.: US 9,285,607 B2
(45) Date of Patent: Mar. 15, 2016

(54) EYEWEAR RETAINER

(71) Applicants: Steve Tahsler, Danville, CA (US); Lori Tahsler, Danville, CA (US)

(72) Inventors: Steve Tahsler, Danville, CA (US); Lori Tahsler, Danville, CA (US)

(*) Notice: Subject to any disclaimer, the term of this patent is extended or adjusted under 35 U.S.C. 154(b) by 0 days.

(21) Appl. No.: 14/502,787

(22) Filed: Sep. 30, 2014

(65) Prior Publication Data
US 2015/0098055 A1   Apr. 9, 2015

Related U.S. Application Data

(60) Provisional application No. 61/888,226, filed on Oct. 8, 2013.

(51) Int. Cl.
G02C 1/00 (2006.01)
G02C 3/02 (2006.01)
G02C 3/04 (2006.01)

(52) U.S. Cl.
CPC .. *G02C 3/02* (2013.01); *G02C 3/04* (2013.01); *G02C 2200/02* (2013.01)

(58) Field of Classification Search
CPC ....... G02C 3/02; G02C 11/00; G02C 2200/02
USPC ............... 351/155, 158; 2/10, 209.13; 24/3.3; 248/309.1, 309.2, 309.4, 902
See application file for complete search history.

(56) References Cited

U.S. PATENT DOCUMENTS

| | | | |
|---|---|---|---|
| 6,210,003 B1 * | 4/2001 | Chan | G02C 3/04 351/155 |
| 6,298,495 B1 | 10/2001 | Totani | |
| 6,481,059 B2 | 11/2002 | Morris | |
| 7,866,813 B2 | 1/2011 | Anhalt | |
| 8,205,985 B1 | 6/2012 | Barajas | |
| 2002/0162194 A1 * | 11/2002 | Ainley | B60R 7/05 24/3.3 |
| 2005/0097709 A1 * | 5/2005 | Chen | A45F 5/00 24/3.12 |
| 2007/0229759 A1 | 10/2007 | Jones | |
| 2008/0099648 A1 | 5/2008 | Broady | |

* cited by examiner

*Primary Examiner* — Huy K Mai
(74) *Attorney, Agent, or Firm* — Dan Shifrin

(57) ABSTRACT

A retainer for eyewear is provided, comprising a rear portion, a front portion, and means for securing the front portion to the rear portion. The rear portion comprises a backing plate having a front surface. The front portion comprises a front piece having a front and back surface, a back piece having a front and back surface, and a bridging piece connecting the front and back pieces at their bottom edges. The bridging piece is biased to force the front surface of the back piece against the back surface of the front piece in a closed position. When the nose bridge of a pair of glasses is inserted between the front and back pieces of the front portion, the front and back pieces temporarily separate and close onto the nose bridge to hold the glasses within the retainer.

10 Claims, 7 Drawing Sheets

EYEWEAR RETAINER

RELATED APPLICATION DATA

The present application is related to and claims the benefit of commonly-owned U.S. Provisional Application Ser. No. 61/888,226, entitled SUNGLASS CLIP and filed on Oct. 8, 2013, which application is incorporated herein by reference in its entirety.

TECHNICAL FIELD

The present invention relates generally to retaining items on articles of clothing and, in particular, to retaining eyewear on an article of clothing, such as a head covering.

BACKGROUND ART

Individuals rely on sunglasses for comfort and safety in a variety of situations. However, the small and fragile nature of sunglasses can result in breakage or loss when on the run or during moments of inattention. Storing sunglasses in a purse, a case, or another container may provide protection but also may reduce accessibility and convenience. Additionally, tucking sunglasses into a shirt or placing them onto a user's head can also result in the sunglasses falling and breaking or getting lost. This can be frustrating and expensive for sunglass wearing individuals, particularly when it is repeated more than once. For those who wear prescription glasses or reading glasses, storing regular glasses when switching to sunglasses, or storing sunglasses when switching to regular glasses, can also be an inconvenience.

SUMMARY OF THE INVENTION

The present invention provides a retainer for eyewear, comprising a rear portion, a front portion, and means for securing the front portion to the rear portion. The rear portion comprises a backing plate having a front surface. The front portion comprises a front piece having a front and back surface, a back piece having a front and back surface, and a bridging piece connecting the front and back pieces at their bottom edges. The bridging piece is biased to force the front surface of the back piece against the back surface of the front piece in a closed position. When the nose bridge of a pair of glasses is inserted between the front and back pieces of the front portion, the front and back pieces temporarily separate and close onto the nose bridge to hold the glasses within the retainer.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
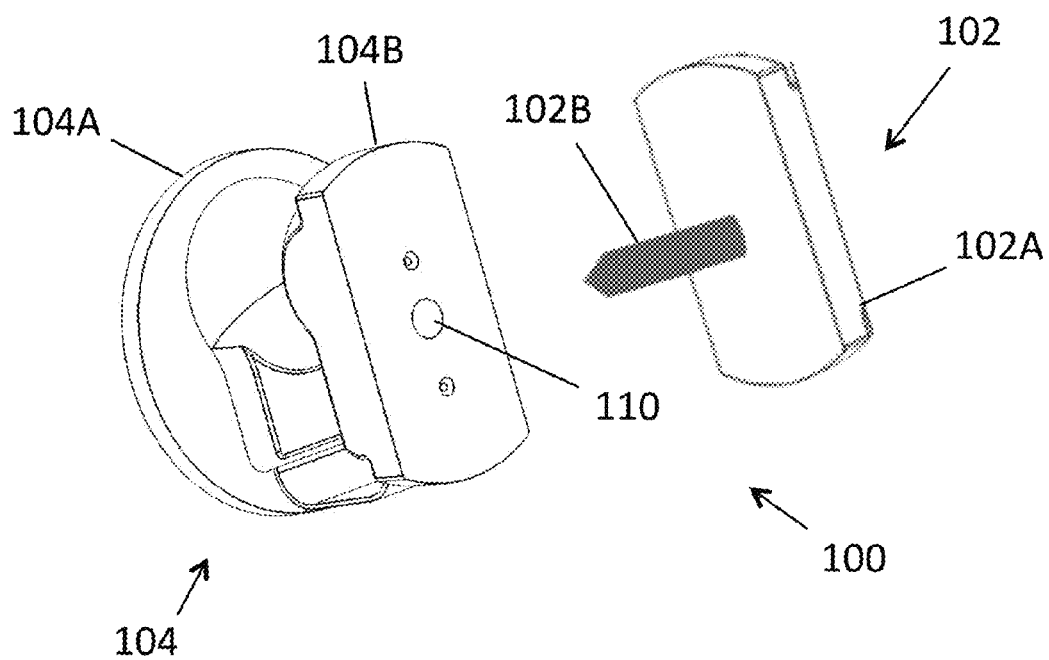
FIG. 1 is a perspective view of embodiment of the eyewear retainer of the present invention.

FIG. 1 is a perspective view of one embodiment of the eyewear retainer 100 of the present invention. The retainer 100 includes a rear portion 102 and a front portion 104. The rear portion 102 may comprise a backing plate 102A, such as metal or plastic disk or other conveniently-manufactured shape, having a pin 102B extending from the front surface of the backing plate 102A.

The front portion 104 of the retainer 100 includes a front piece 104A and a back piece 104B, which may be of approximately equal size and shape or different size and shape. The front and back pieces 104A, 104B may be formed from metal or plastic. They may also be formed in any other shape and in any color and may provide a decorative appearance. For example, the front piece 104A may be formed in the shape and colors of a sports team logo, a flag, a product name or logo, or the like or may have a logo, name, flag, or the like printed or embossed on the front surface. Preferably, small ribs 108A, 108B, which may be circular, oval, or any other shape, extend from the back surface of the front piece 104A and the front surface of the back piece 104B and touch each other when the retainer 100 is in a closed position as illustrated. The back surface of the back piece includes an opening 110 sized to receive and secure the pin 102B. For example, the pin 102B may have one or more ribs around the outside of the pin 102B and the opening 110 may have a like number of flexible ribs around the inside of the opening 110 to allow the pin 102B to remain secure within the opening 110 but also be able to be inserted and removed when desired. Alternatively, the pin 102B may have a circumferential notch that mates with a rib around the inside of the opening 110, again to allow the pin 102B to remain secure within the opening 110 but also be able to be inserted and removed when desired. Other means of securing the pin 102B inside the opening 110 may also be used within the scope of the present invention.

Figure 2:
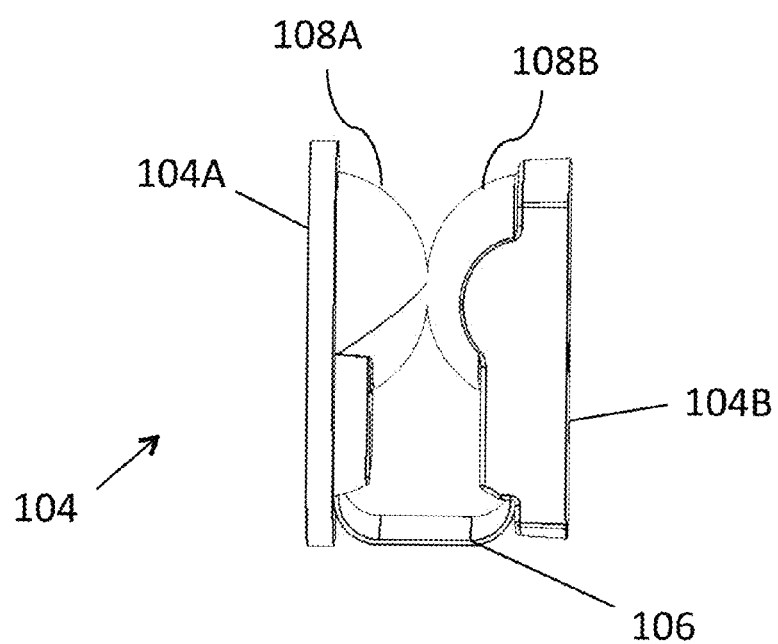
FIG. 2 is a side view of the front portion of the eyewear retainer of FIG. 1.
Figure 3:
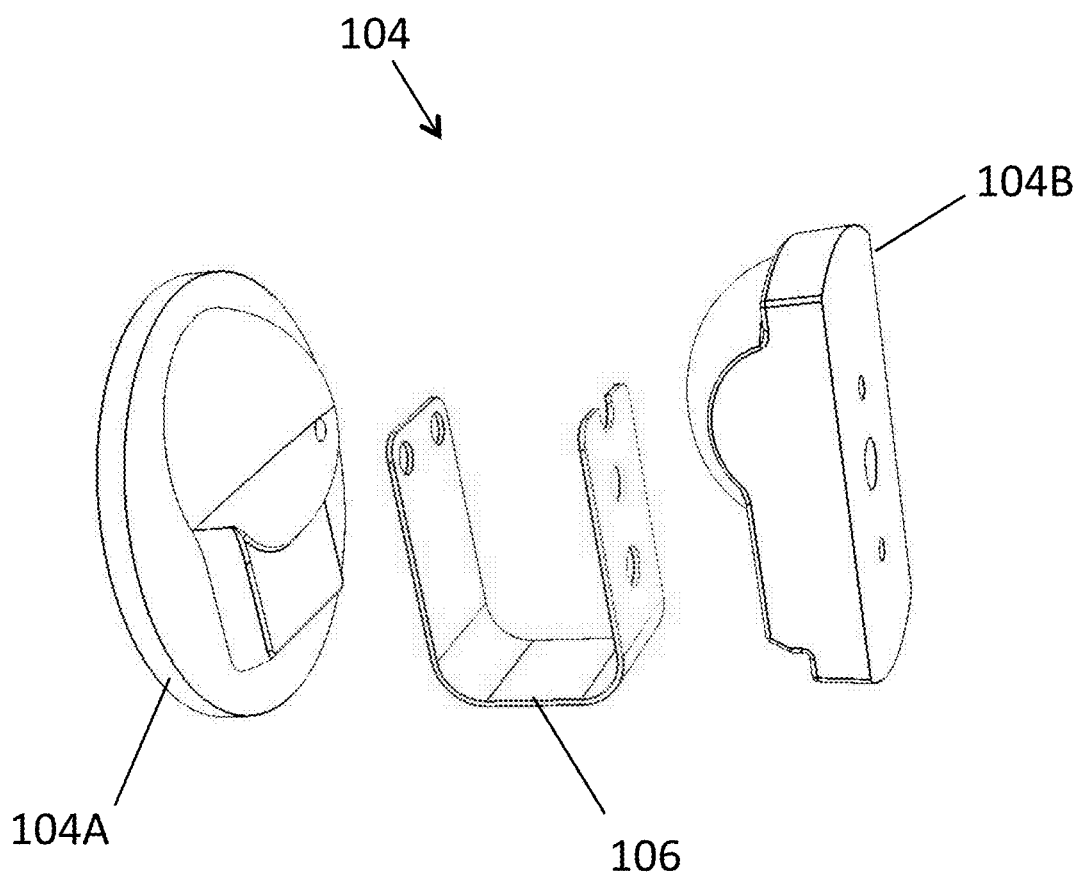
FIG. 3 is an exploded view of the front portion of the eyewear retainer of FIG. 1.
Figure 4:
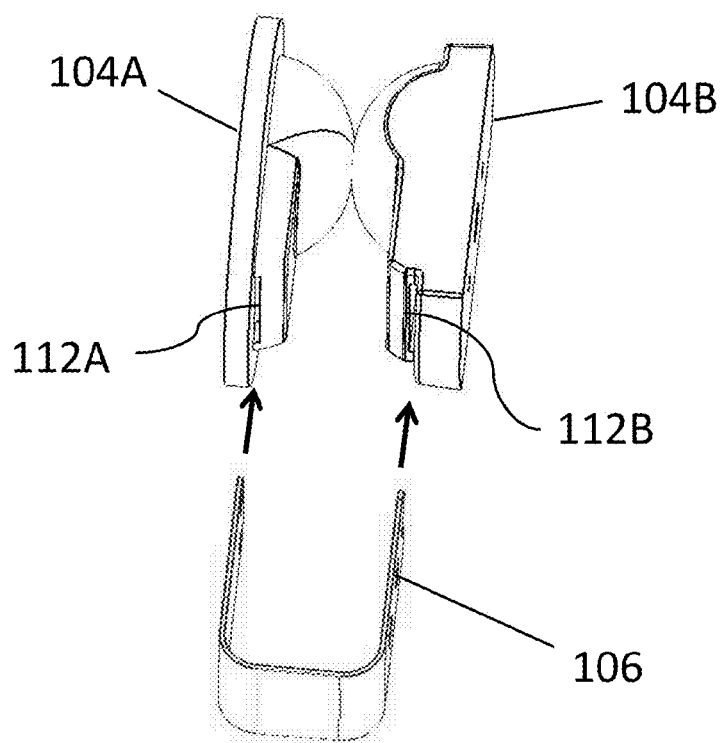
FIG. 4 illustrates one method of assembling the front portion of the eyewear retainer of FIG. 1.
Figure 5:
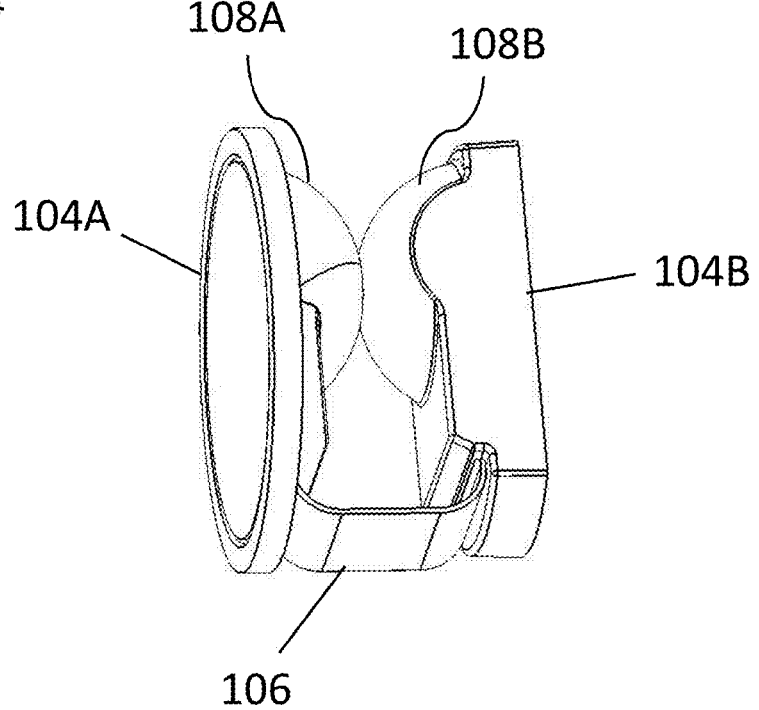
FIG. 5 the assembled front portion of the eyewear retainer of FIG. 1.

The front and back pieces 104A, 104B may be held together at their bottom edges with a spring-acting bridging piece 106 (FIG. 2). In the embodiment illustrated, the front and back pieces 104A, 104B may be formed from plastic or metal and the bridging piece 106 may be separately formed from, for example, a plastic or metal leaf-spring material. FIG. 3 is an exploded view of the front and back pieces 104A, 104B, and the bridging piece 106, formed in a U-shape. The spring-acting bridging piece 106 is biased so as to force the ribs 108A, 108B against each other in the closed position while still allowing the ribs 108A, 108B to be forced apart a small distance to a temporary open position under a separating force, such as the insertion of the nose bridge of a pair of glasses. FIG. 4 illustrates one method of assembling the pieces 104A, 104B, 106. With the ribs 108A, 108B touching, the legs of the bridging piece 106 are inserted into corresponding slots 112A, 112B in the bottoms of the front and back pieces 104A, 104B, as indicated by the arrows in FIG. 4. The bridging piece 106 may then be secured with screws, adhesive, or being pressure fitted (FIG. 5). The bridging piece 106 may also be secured on the inside surfaces of the front and back pieces 104A, 104B in any other appropriate manner, such as with screws or adhesive. In another embodiment, the front and back pieces 104A, 104B and the bridging piece 106 may be formed together from a single piece of plastic or metal. In still another embodiment, the ribs 108A, 108B may be formed from a pliable material, such as rubber or a soft plastic and secured to the inside surfaces of the front and back pieces 104A, 104B.

Figure 6A:
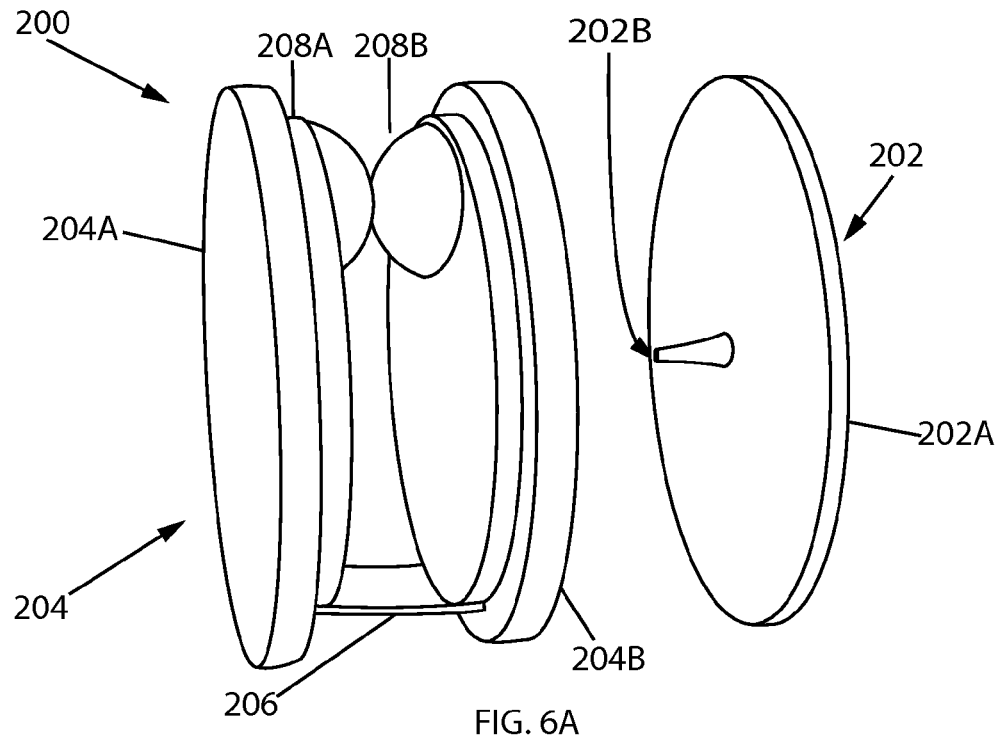
FIG. 6A is a front perspective view of another embodiment of the eyewear retainer of the present invention.
Figure 6B:
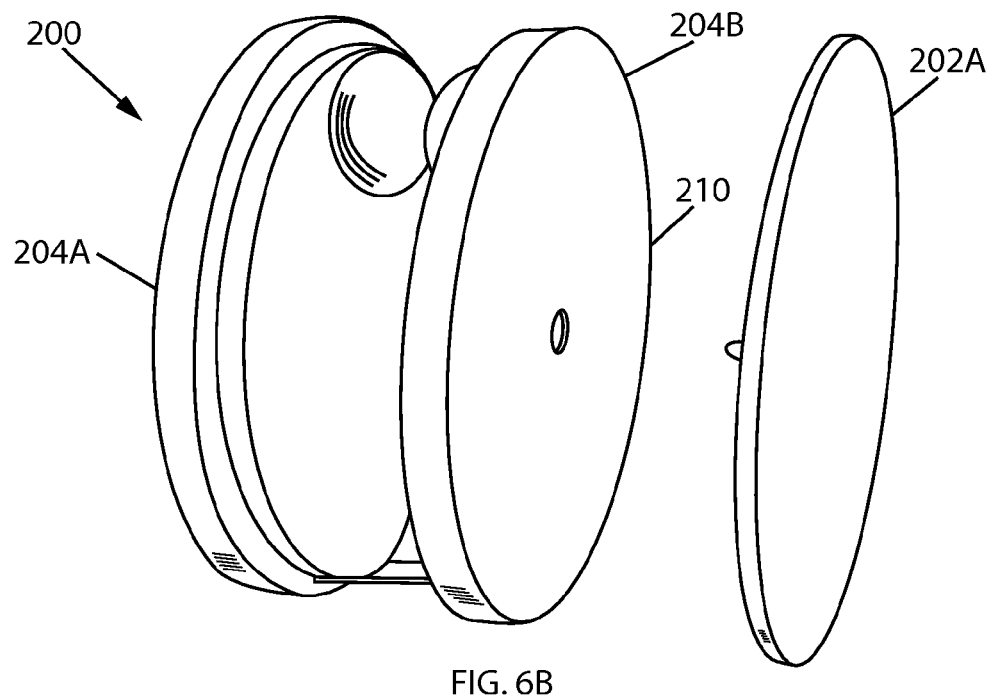
FIG. 6B is a rear perspective view of the eyewear retainer of FIG. 6A.

FIGS. 6A and 6B are front and rear perspective views, respectively, of another embodiment of the eyewear retainer 200 of the present invention. The retainer 200 includes a rear portion 202 and a front portion 204. The rear portion 202 may comprise a backing plate 202A, such as metal or plastic disk or other conveniently-manufactured shape, having a pin 202B extending from the front surface of the backing plate 202A. A hole 210 in the back surface of the backing piece 204B is configured to receive the pin 202B when the rear and front portions 202, 204 of the retainer 200 are secured together with the ribs 208A, 208B held against each other by the bridging piece 206.

The front portion 204 of the retainer 200 includes a front piece 204A and a back piece 204B, of approximately equal size and shape. The front and back pieces 204A, 204B may be disk-shape and formed from metal or plastic. They may also be formed in any other shape and in any color and may provide a decorative appearance. For example, the front piece 204A may be formed in the shape and colors of a sports team logo, a flag, a product name or logo, or the like or may have a logo, name, flag, or the like printed or embossed on the front surface. Preferably, small ribs 208A, 208B, which may be circular, oval, or any other shape, extend from the back surface of the front piece 204A and the front surface of the back piece 204B. The back surface of the back piece includes an opening 210 size to receive and secure the pin 202B. For example, the pin 202B may have one or more ribs around the outside of the pin 202B and the opening 210 may have a like number of flexible ribs around the inside of the opening 210 to allow the pin 202B to remain secure within the opening 210 but also be able to be inserted and removed when desired. Alternatively, the pin 202B may have a circumferential notch that mates with a rib around the inside of the opening 210, again to allow the pin 202B to remain secure within the opening 210 but also be able to be inserted and removed when desired. Other means of securing the pin 202B inside the opening 210 may also be used within the scope of the present invention.

The front and back pieces 204A, 204B may be held together at their bottom edges with a spring-acting bridging piece 206. In one embodiment, the front and back pieces 204A, 204B and the bridging piece 206 may be formed together from a single piece of plastic or metal. In another embodiment, the bridging piece 206 may be formed separately from, for example, a metal or plastic leaf-spring material. The bridging piece 206 may be biased so as to force the ribs 208A, 208B against each other in the closed position while still allowing the ribs 108A, 108B to be forced apart a small distance to a temporary open position under a separating force, such as the insertion of the nose bridge of a pair of glasses.

In use, a sunglasses wearer may force the pin 202B through the back of an article of clothing, such as a hat until the pin 202B extends through the front of the article. To increase the wearer's comfort, the back portion 202 may be inserted inside of the sweat band of the hat and the pin pushed through the hat material. The opening 210 of the front portion 204 is then placed onto the pin 202B to secure the front portion 204 onto the article of clothing. The space between the front and back pieces 204A, 204B is preferably oriented horizontally.

Figure 9:
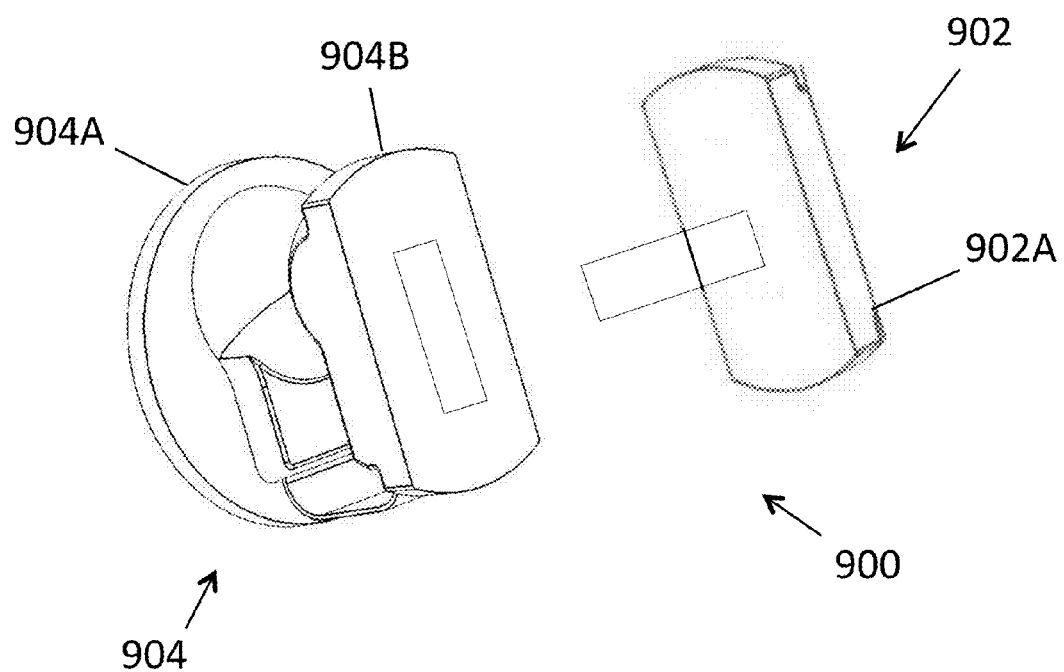
FIG. 9 is a perspective view of still another embodiment of the eyewear retainer of the present invention.

In an alternative embodiment, illustrated in FIG. 9, one or both of the backing plate 902A of the back portion 902 and the back piece 904B of the front portion 904 may be formed from a magnetic material to allow the front and back portions 902, 904 to be held together with the article of clothing between them in magnetic cooperation with each other.

After the retainer 200 has been secured to the article of clothing, the nose bridge of a pair of glasses may be inserted between the front and back pieces 204A, 204B, momentarily separating the ribs 208A, 208B, then allowing the front and back pieces 204A, 204B to close onto the nose bridge of the glasses. The nose bridge is then held firmly between the front and back pieces 204A, 204B.

Figure 7A:
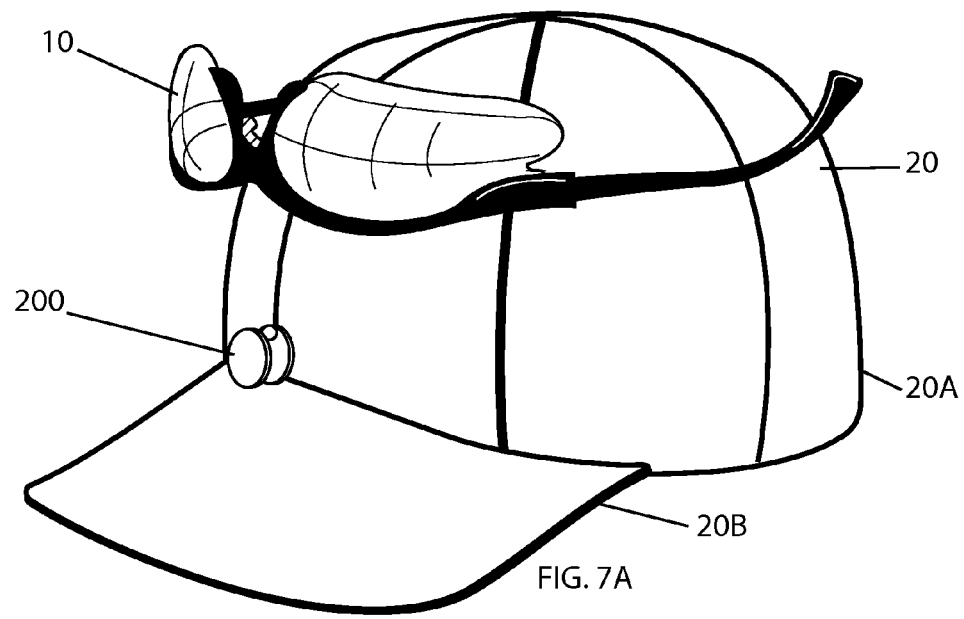
FIG. 7A illustrates a pair of sunglasses being placed into the eyewear retainer of FIG. 6A on the front of a hat.
Figure 7B:
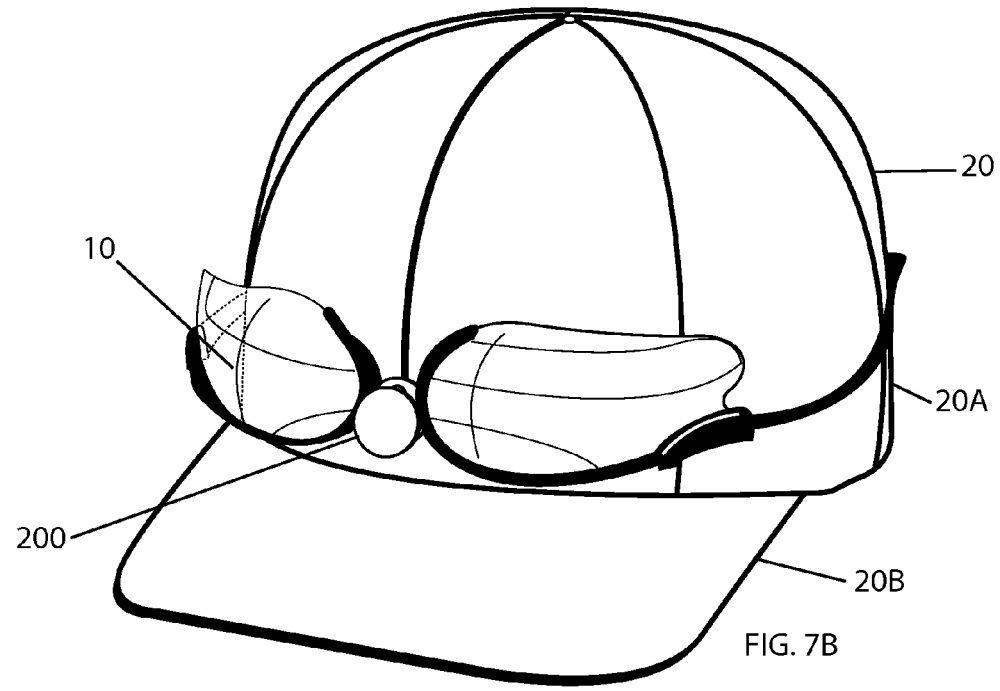
FIG. 7B illustrates the sunglasses of FIG. 7A in place in the eyewear retainer of FIG. 1A.
Figure 8:
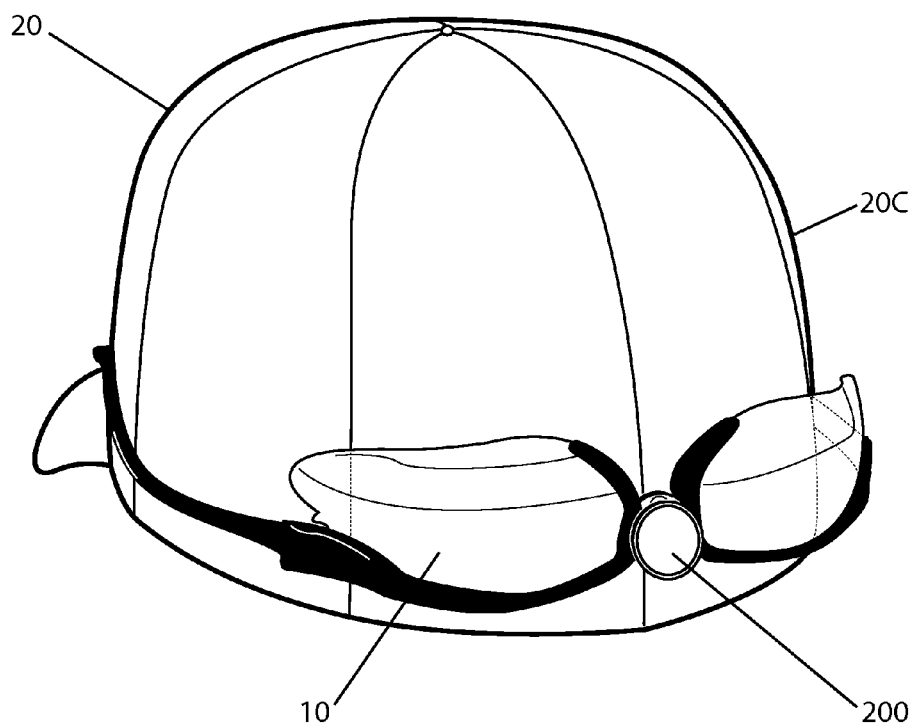
FIG. 8 illustrates a pair of sunglasses in place in the eyewear retainer of FIG. 6A on the rear of a hat.

FIG. 7A illustrates a pair of sunglasses 10 being placed into the sunglasses retainer of FIG. 6A on the front 20A of a baseball-type hat 20B above the bill 20C. FIG. 7B illustrates the sunglasses 10 in secured place in the retainer 200. FIG. 8 illustrates the sunglasses 10 in place in a retainer 200 that has been secured to the rear 20C of the hat 20.

It will be appreciated that the retainer 100, 200 may be secured to other articles of clothing or to other types of items, such as, for example, on a head scarf, the inside of a shirt pocket, or the inside or outside of a handbag or fanny-pack. An alternative configuration of the retainer 100, 200 may be manufactured for use inside a pocket with a decorative front portion being exposed on the outside of the pocket and a back portion, having the three-piece clip, being on the inside of the pocket and with the space between the front and rear pieces turned in a vertical orientation. It will also be appreciated that the retainer 100, 200 may be used to hold other types of eyewear, such as prescription glasses while the hat-wearer is wearing sunglasses, reading glasses, or protective shooting glasses, to name just a few examples.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A retainer for eyewear, comprising:
   a rear portion, comprising:
      a backing plate having a front surface;
   a front portion, comprising:
      a front piece having a front and back surface;
      a back piece having a front and back surface; and
      a bridging piece connecting the front and back pieces at their bottom edges and biased to force the front surface of the back piece against the back surface of the front piece in a closed position; and means for removably securing the front portion to the rear portion;

whereby, when the nose bridge of a pair of glasses is inserted between the front and back pieces of the front portion, the front and back pieces temporarily separate and close onto the nose bridge to hold the glasses within the retainer.

2. The eyewear retainer of claim 1, further comprising:
a first rib extending from the back surface of the front piece; and
a second rib extending from the front surface of the back piece;
the first and second ribs configured to touch each other when the front portion of the retainer is in the closed position.

3. The eyewear retainer of claim 1, the means for securing the front portion to the rear portion comprises:
a pin extending from the front surface of the backing plate; and
an opening in the back surface of the back piece of the front portion configured to receive and hold the pin.

4. The eyewear retainer of claim 1, the means for securing the front portion to the rear portion comprises at least one of the front surface of the backing plate and the back surface of the back piece of the front portion being formed from a magnetic material.

5. The eyewear retainer of claim 1, wherein the bridging piece is formed from a spring-leaf material.

6. The eyewear retainer of claim 5, wherein:
the bridging piece has a U-shaped having legs; and
the front and back pieces of the front portion each has an opening in an edge configured to receive and hold a leg of the bridging piece.

7. A retainer for eyewear, comprising:
a rear portion, comprising:
a backing plate; and
a pin extending from a front surface of the backing plate;
a front portion, comprising:
a front piece having a front and back surface;
a back piece having a front and back surface, the back surface having an opening configured to receive and hold the pin to removably secure the front portion to the rear portion; and
a bridging piece connecting the front and back pieces at their bottom edges and biased to force the front surface of the back piece against the back surface of the front piece in a closed position;
whereby, when the nose bridge of a pair of glasses is inserted between the front and back pieces of the front portion, the front and back pieces temporarily separate and close onto the nose bridge to hold the glasses within the retainer.

8. The eyewear retainer of claim 7, further comprising:
a first rib extending from the back surface of the front piece; and
a second rib extending from the front surface of the back piece;
the first and second ribs configured to touch each other when the front portion of the retainer is in the closed position.

9. The eyewear retainer of claim 7, wherein the bridging piece is formed from a U-shaped spring-leaf material having legs configured to be received into openings in edges of the front and back pieces of the front portion, whereby the bridging piece secures the front and back pieces to each other.

10. The eyewear retainer of claim 7, further comprising:
a first rib extending from the back surface of the front piece; and
a second rib extending from the front surface of the back piece;
the first and second ribs configured to touch each other when the front portion of the retainer is in the closed position.

* * * * *